US007549226B2

(12) United States Patent
Mortensen

(10) Patent No.: US 7,549,226 B2
(45) Date of Patent: Jun. 23, 2009

(54) SELF-LOCKING CUTTING TOOL FOR PLASTIC PIPES

(75) Inventor: Mark A. Mortensen, Wheatridge, CO (US)

(73) Assignee: Duane D. Robertson, Golden, CO (US)

( * ) Notice: Subject to any disclaimer, the term of this patent is extended or adjusted under 35 U.S.C. 154(b) by 247 days.

(21) Appl. No.: 11/484,077

(22) Filed: Jul. 12, 2006

(65) Prior Publication Data

US 2008/0010835 A1 Jan. 17, 2008

(51) Int. Cl.
*B23D 21/06* (2006.01)

(52) U.S. Cl. ............................................ 30/92; 30/258

(58) Field of Classification Search ..................... 30/92, 30/261, 262, 258; 81/332
See application file for complete search history.

(56) References Cited

U.S. PATENT DOCUMENTS

| | | | | |
|---|---|---|---|---|
| 191,416 | A * | 5/1877 | Fetter | 30/428 |
| 936,390 | A * | 10/1909 | Washburn | 30/254 |
| 1,261,284 | A | 4/1918 | Phelps | |
| 3,562,908 | A | 2/1971 | Rogers | |
| 5,203,084 | A | 4/1993 | Kuo | |
| 5,930,900 | A | 8/1999 | Chang | |
| 6,370,780 | B1 * | 4/2002 | Robertson et al. | 30/261 |
| 7,080,455 | B1 * | 7/2006 | Ronan et al. | 30/122 |

* cited by examiner

*Primary Examiner*—Omar Flores-Sanchez
(74) *Attorney, Agent, or Firm*—W. Scott Carson

(57) ABSTRACT

A locking mechanism for a cutting tool for plastic pipes. The tool includes two elongated members pivotally connected to each other in a scissors-like manner. Each elongated member has a handle portion and a jaw portion with one jaw portion including a knife blade and the other an anvil. In the preferred embodiments, the jaws of the cutting tool are spring-biased apart toward an open position. The locking mechanism for the tool includes a bail member on one handle and a C-shaped catch member on the other. In operation, the bail member can be pivoted to an extended position to contact and automatically slide along the opposite handle into a locking position with the catch member as the handles are squeezed together.

19 Claims, 6 Drawing Sheets

*Fig. 10*
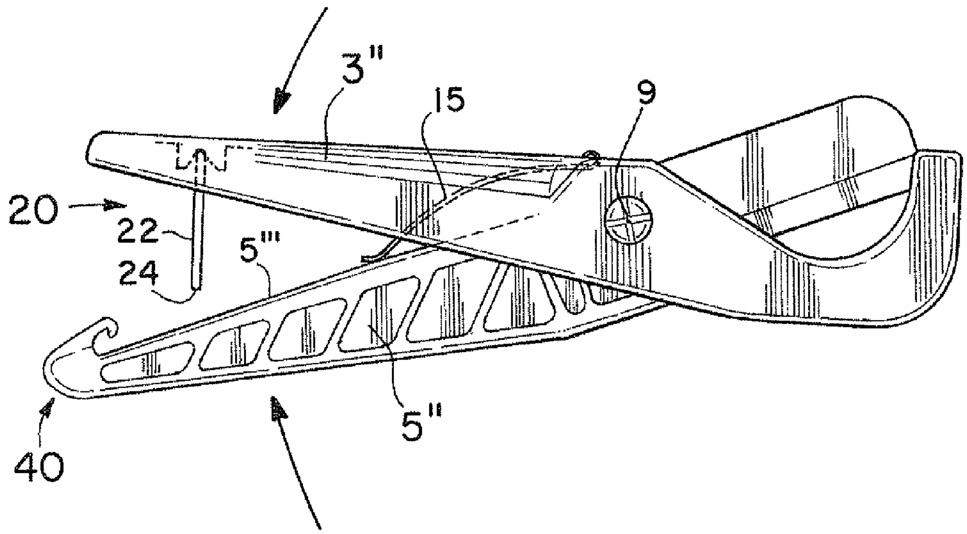
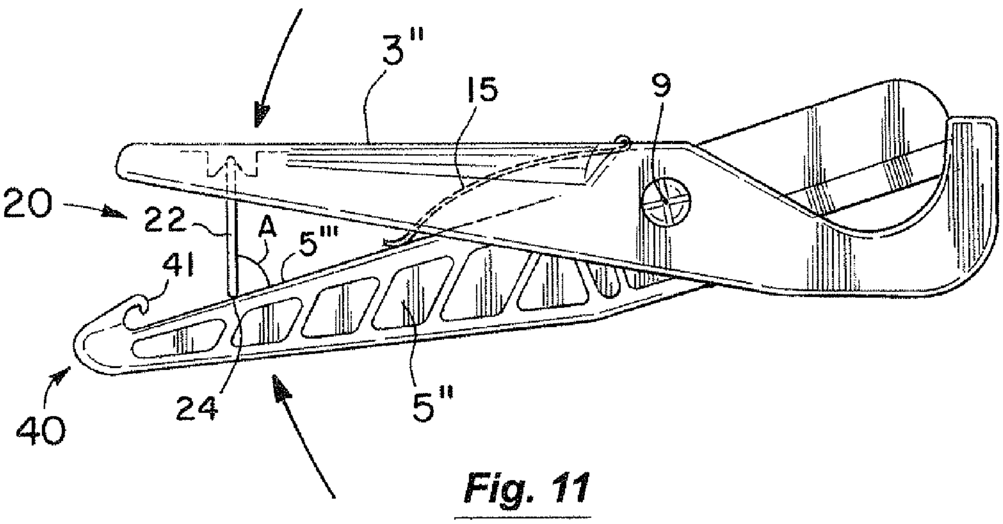
*Fig. 11*

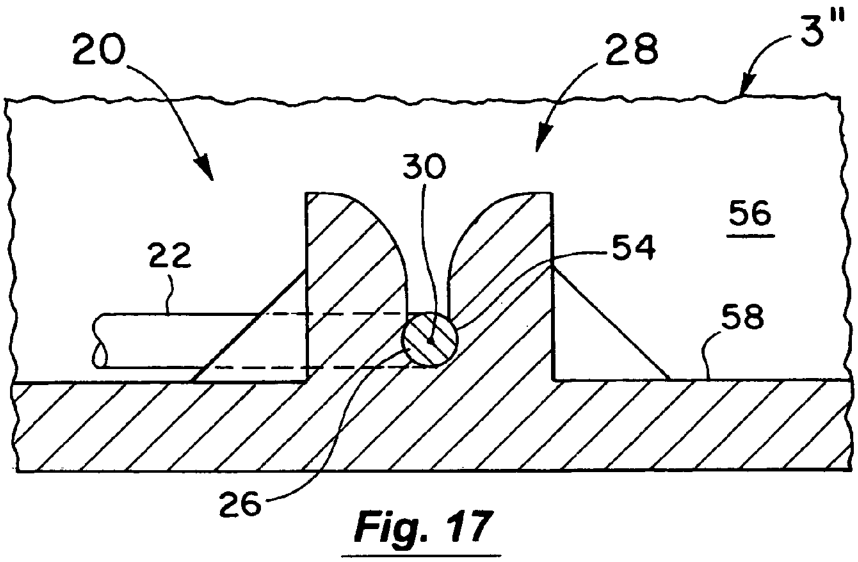
Fig. 17
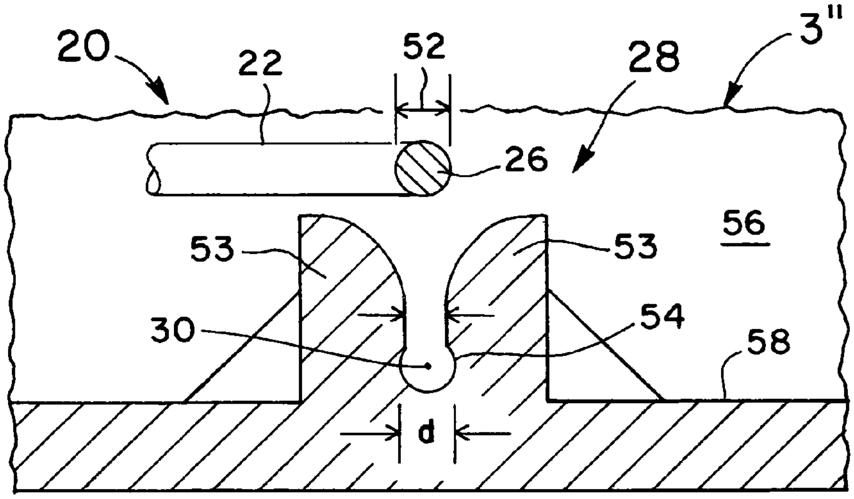
Fig. 18
Fig. 19
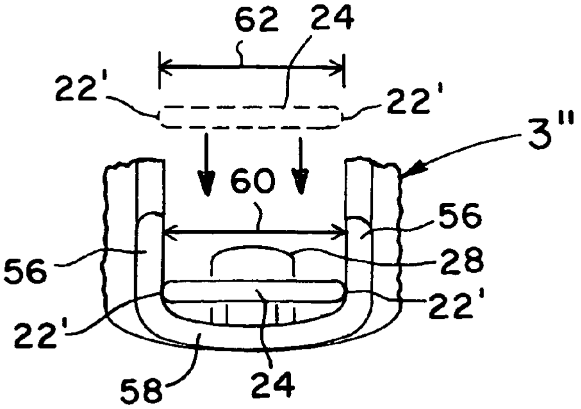

SELF-LOCKING CUTTING TOOL FOR PLASTIC PIPES

BACKGROUND OF THE INVENTION

1. Field of the Invention

This invention relates to the field of cutting tools for plastic pipes and more particularly to the field of manually operated cutting tools with locking mechanisms that hold the jaws of the tool safely closed when not in use.

2. Discussion of the Background

Cutting tools for plastic pipes are widely used throughout the world and are an essential piece of equipment for virtually anyone who works with plastic pipes. In a typical design, two elongated members are pivotally connected together in a scissors-like manner. In operation, the handles of the tool can be manually manipulated to separate them and open the jaws of the tool to receive the plastic pipe to be cut. In doing so, the handles can be rubbed along the user's leg to separate them and open the tool's jaws or the user can extend his or her fingers to separate the handles. Once opened with the pipe received between the jaws of the tool, the handles can then be squeezed together to drive the edge of the knife blade on one of the jaws into the pipe. At the same time, the tool is normally swung relative to the pipe as the knife edge continues to be driven into the pipe until the pipe is eventually severed.

In other designs of such cutting tools, a spring or springs are provided to bias the handles apart and the jaws into an open position to receive the pipe. When a number of cuts are to be done, many users find it more efficient to have a spring-biased tool rather than one whose handles must be manually opened for each cut.

In both the manually operated and spring-biased designs, it is desirable to have locking mechanisms to secure the tool in a closed position with the jaws safely together when the tool is not in use. A very popular locking mechanism involves providing a bail on the end of one of the tool handles. In use, the tool can be manually closed to bring the handle ends together and the bail then pivoted over the end of the other handle. To unlock the tool, the bail can be either manually pivoted to release the other handle or rubbed against something to move it away from engagement with the other handle. Although simple and easy to operate, this locking arrangement has the disadvantage that the bail may be inadvertently struck and released as the tool is handled. This can occur because the bail is on the outside of the handle ends exposing it to being contacted and released unintentionally. If the tool is spring-biased toward its open position, the inadvertent release of the locking bail can then cause the tool to open, undesirably exposing the cutting blade of the tool. Other locking designs have the bails mounted on the inside of the handles but are somewhat complicated and expensive to make and can still be inadvertently released In contrast, the self-locking cutting tool of the present invention is relatively simple to operate and is less prone to being inadvertently released.

SUMMARY OF THE INVENTION

This invention involves a locking mechanism for a cutting tool for plastic pipes. The tool includes two elongated members pivotally connected to each other in a scissors-like manner. Each elongated member has a handle portion and a jaw portion with one jaw portion including a knife blade and the other an anvil. In the preferred embodiments, the jaws of the cutting tool are spring-biased apart toward an open position.

The locking mechanism for the cutting tool includes a bail member on the handle portion of one of the elongated members and a C-shaped catch member on the handle portion of the other elongated member. The bail member is pivotally mounted to the handle portion and can be manually moved to an out-of-the-way position while the tool is being used to make cuts. Upon completion of the cutting, the bail member can be manually pivoted to extend toward a surface on the opposing handle portion. As the handle portions are then squeezed together, the bail member abuts and slides along the surface of the other handle portion into engagement with the C-shaped catch member to secure the elongated members in a closed position. In the closed position, the knife blade is safely received in the anvil of the opposite jaw.

The operation of the locking mechanism is automatic once the bail member is moved to its extended position and the handle portions squeezed together. In the preferred embodiments, the bail member is pivotally mounted to the handle portion by a frictional fitting. In this regard and once manually moved to its out-of-the-way position or its extending position, the bail member will then stay in place and will resist any free movement of it about its pivotal axis. An additional frictional or interference fit is also provided to aid in holding the bail member in its out-of-the-way or non-locking position when the tool is being used to make cuts.

BRIEF DESCRIPTION OF THE DRAWINGS

FIG. 17 is a view taken along line 17-17 of FIG. 7 showing the compression or frictional fit of the pivot members of the bail in the mounting on the handle.

FIG. 18 is an exploded view of FIG. 17.

FIG. 19 is an end view taken along line 19-19 of FIG. 7 showing the interference or frictional fit of the U-shaped bail member with the U-shaped inner cross section of the handle to which it is pivotally mounted.

DETAILED DESCRIPTION OF THE INVENTION

Figure 1:
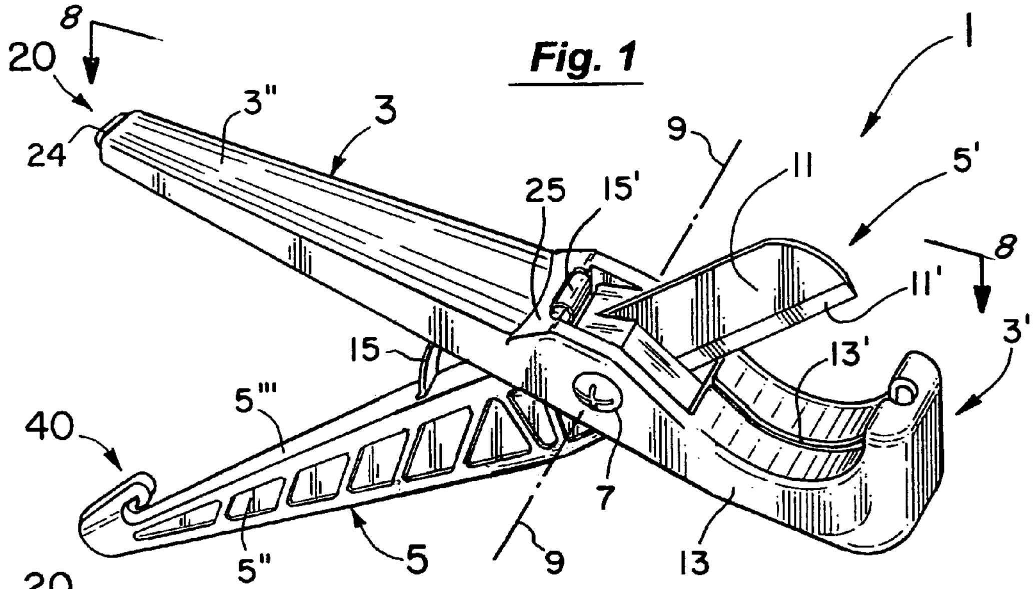
FIG. 1 is a perspective view of the cutting tool of the present invention.

As shown in the perspective view of FIG. 1, the cutting tool 1 of the present invention includes two elongated members 3 and 5. The elongated members 3 and 5 are connected at 7 in a scissors-like manner for pivotal movement relative to each other about the axis 9. The axis 9 as shown is substantially intermediate the respective ends of the members 3 and 5. Each elongated member 3 and 5 has a jaw portion 3' and 5' and a handle portion 3" and 5". The jaw portion 5' of the elongated member 5 (see also FIG. 2) has a knife blade 11 at one end thereof and the opposing jaw portion 3' of the elongated member 3 has a curved anvil 13 at the end thereof.

In operation, the pipe 2 to be cut (see FIG. 2) is first received between the opened jaw portions 3' and 5'. The handle portions 3" and 5" are then manually squeezed together as the cutting tool 1 is preferably swung relative to the pipe 2 until the pipe 2 is severed (see FIG. 3). In doing so as illustrated in FIG. 1-4, the cutting edge 11' of the knife blade 11 (FIG. 2) is received in the slot 13' (FIGS. 3 and 4) of the anvil 13. Additionally, as the handle portions 3" and 5" are squeezed together from the position of FIG. 2 to the position of FIG. 3, the cutting tool 1 preferably has a return spring 15 (see FIGS. 1-3) that will be compressed from the relaxed position of FIG. 2 to the compressed position of FIG. 3. Consequently, upon releasing the pressure on the handle portions 3" and 5" in FIG. 3, the compressed return spring 15 will move the handle portions 3" and 5" apart to the position of FIG. 2 to again open and separate the knife blade 11 and anvil 13 to receive another pipe section 2 to be cut.

Figure 5:
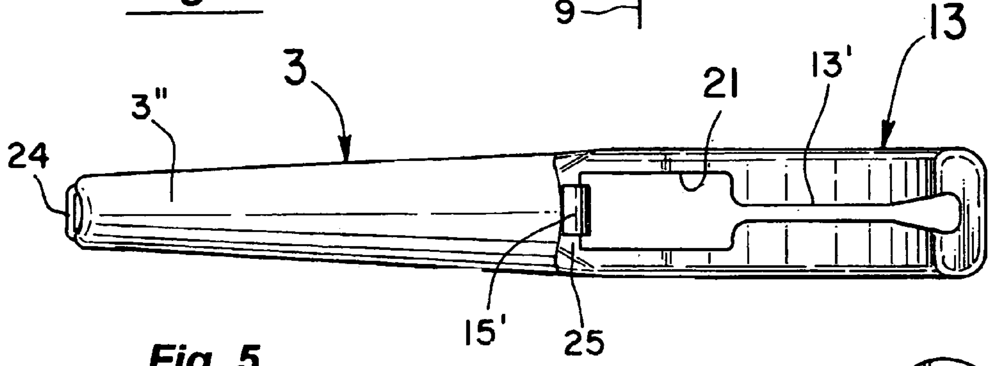
FIG. 5 is view taken along line 5-5 of FIG. 6 of the elongated member which has the anvil in it and the central aperture through it to receive the other elongated member.

In the preferred embodiments, the return spring 15 is a leaf spring. Additionally, in the preferred embodiments, the parts of the cutting tool 1 including the elongated members 3 and 5 and the leaf spring 15 have been specifically designed to be easily and cost effectively manufactured and assembled. In this regard as illustrated in FIG. 5, the elongated member 3 is molded with a central aperture 21 extending through it. During assembly, the other elongated member 5 can be positioned as in FIG. 6 and then moved as indicated through the aperture 21 to the relative positioning of FIG. 1, where the two elongated members 3 and 5 can then be secured together at 7 to form the scissors-like shape of the cutting tool 1.

Figure 6:
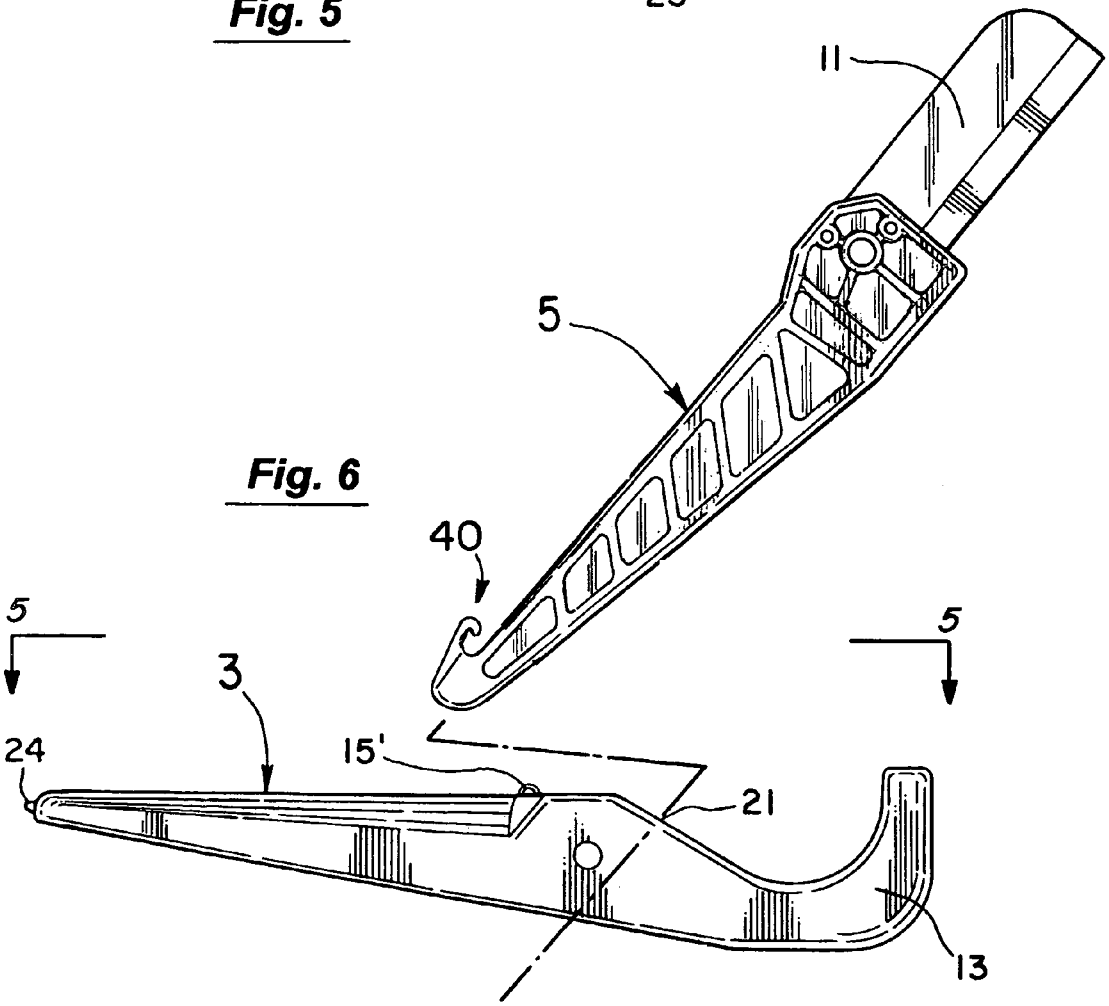
FIG. 6 is a view of the two elongated members of the tool shown in a pre-assembly position with the one member aligned to be received in the central aperture in the other member.

The leaf spring 15 can be mounted on the elongated member 3 either before the members 3 and 5 are assembled as in FIG. 6 or after the members 3 and 5 are secured together In both cases, the end 15' of the leaf spring 15 only needs be clipped over the edge portion 25 (see FIGS. 5) of the aperture 21.

Figure 2:
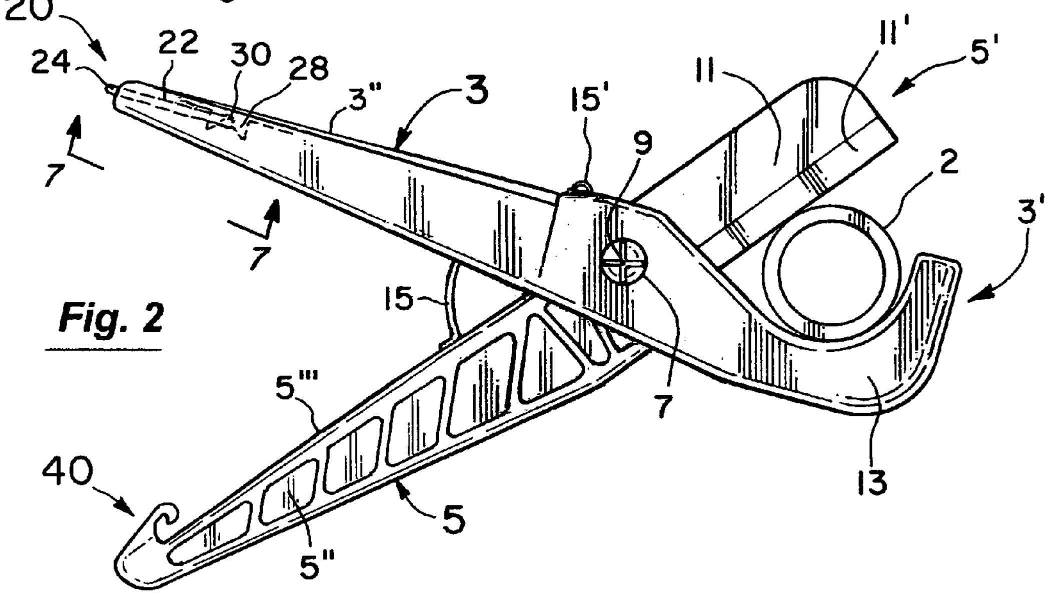
FIG. 2 is a side elevational view of the tool with the locking mechanism disengaged and the handle portions separated by the force of the spring to open the jaws to receive the pipe to be cut.
Figure 3:
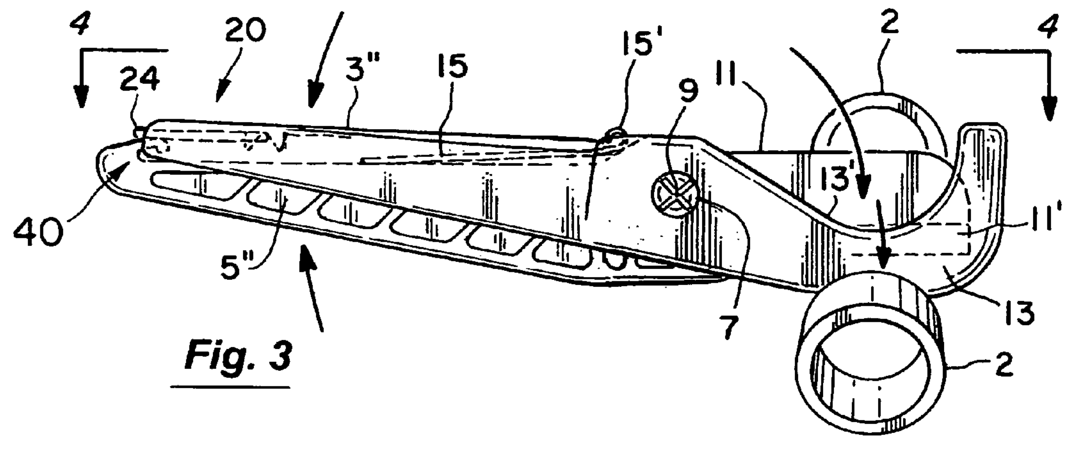
FIG. 3 is a side elevational view of the tool of FIG. 2 with its handles squeezed completely together and the jaws cutting through the pipe.
Figure 4:
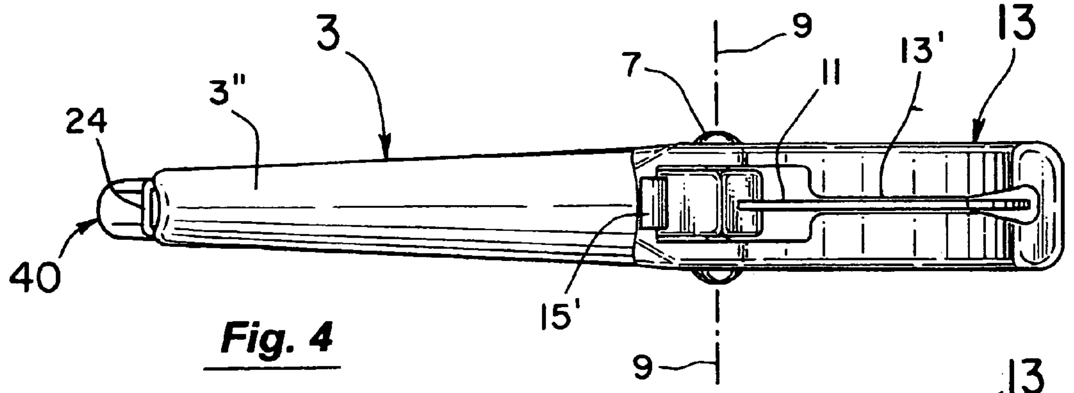
FIG. 4 is a top plan view taken along line 4-4 of FIG. 3.

As shown in FIGS. 1-3, the bail member 20 of the locking mechanism of the present invention can be moved to an out-of-the-way position during the cutting operation of the tool 1. In this regard, the bail member 20 of the locking mechanism (see FIG. 7 which is an enlarged view taken along line 7-7 of FIG. 2) is substantially U-shaped with legs 22 and a base portion 24 extending therebetween. Opposite the base portion 24, pivot members 26 are mounted to the legs 22. The pivot members 26 in turn are received in the mounting 28 on the underside of the handle portion 3 to support the bail member 20 for pivotal movement related to the handle portion 3 about the axis 30. In the out-of-the-way position of FIGS. 1-3 and 7, the base portion 24 of the bail member 20 extends outwardly beyond the end of the handle portion 311 (see also FIG. 8) relative to the main pivotal axis 9 of the tool 1. The legs 22 of the bail member 20 preferably extend substantially perpendicular to the main pivotal axis 9 in this position. As indicated above and in this out-of-the-way position, the tool 1 as shown in FIGS. 1-3 can be repeatedly operated to make multiple pipe cuts.

Figure 13:
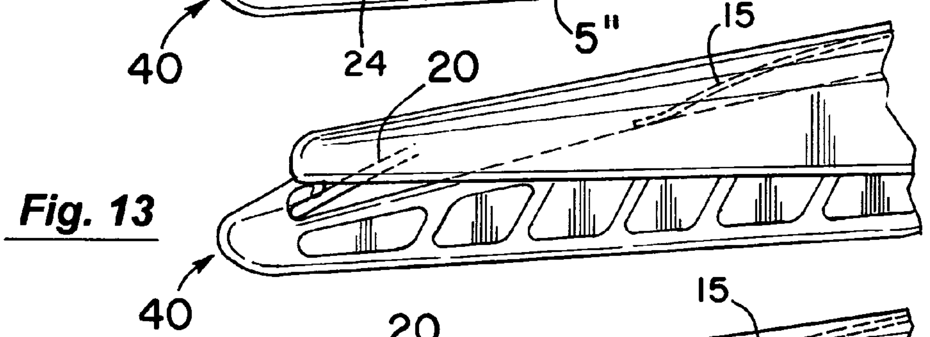
Figure 14:
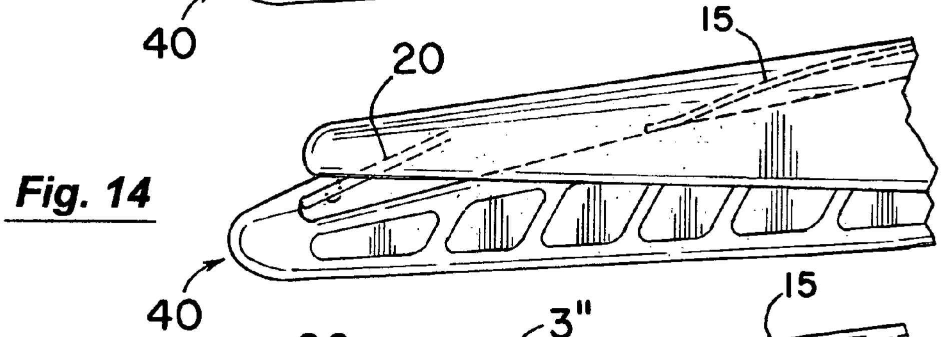
Figure 15:
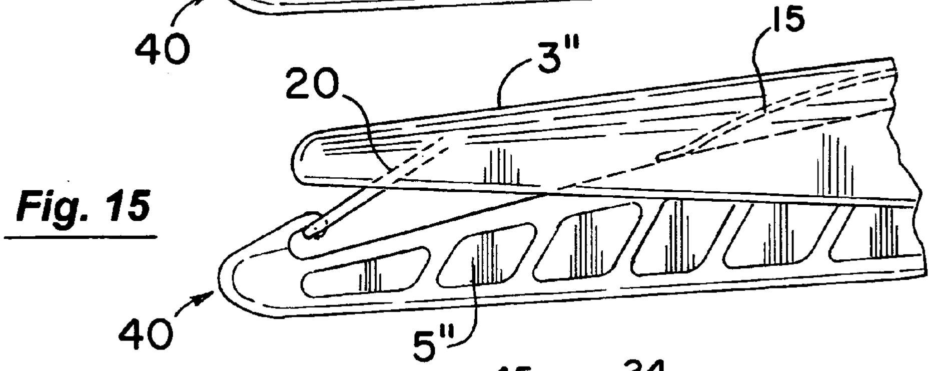

Once the cutting operation or operations are done and it is desired to lock the tool 1 safely in its closed position so as not to expose the cutting edge 11' of the knife blade 11, the sequence of FIGS. 8-15 can be followed. In doing so, the bail member 20 is first moved from its out-of-the-way position of FIGS. 1-3 and 8 to the position shown in solid lines in FIG. 9. This can be done by manually engaging the base portion 24 of the bail member 20 (as shown in dotted lines in FIGS. 8-9) and pivoting the bail member 20 about the axis 30 to the position shown in solid lines in FIG. 9. As the handle portions 3" and 5" are thereafter squeezed together (FIGS. 10-11), the base portion 24 of the bail member 20 will abut the inner surface 5'" of the handle portion 5" (FIG. 11). Further squeezing will then slide the bail member 20 along the surface 5'" (FIG. 12) to engage the C-shaped catch member 40 (FIGS. 13-15) of the handle portion 5 in a locking position (FIG. 15).

Figure 16:
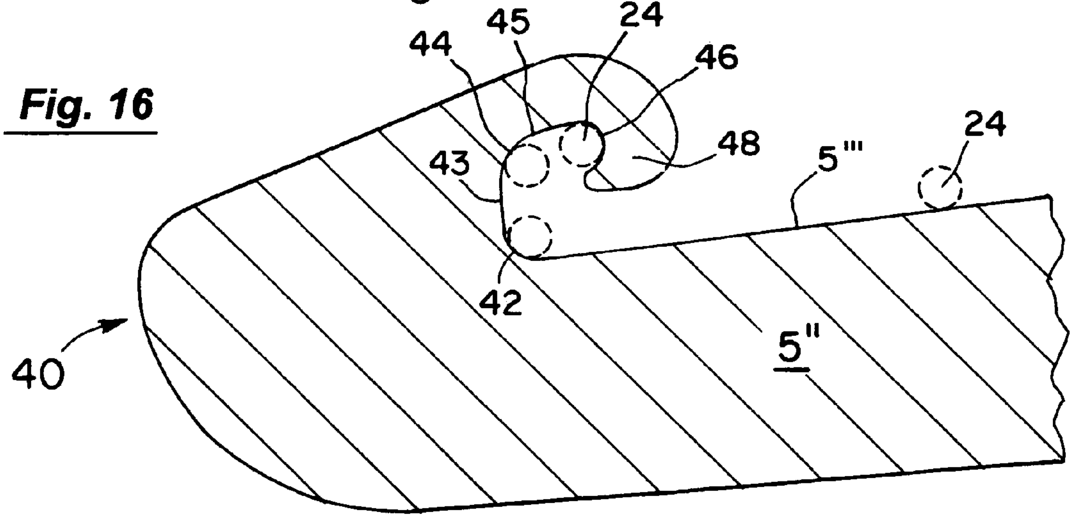
FIG. 16 is an enlarged view of the other handle and its catch member illustrating the various positions of the bail as it is moved along the handle in the sequence of FIGS. 12-15.

In doing so as best seen in FIGS. 12-15 and the enlarged FIG. 16, the base portion 24 of the bail member 20 abutting the handle surface 5'" (FIG. 12) will slide along the surface 5'" into contact with the lower corner 42 of the C-shaped catch member 40 (FIGS. 13 and 16). The handle portions 3" and 5" and spring 15 at this point are slightly compressed beyond the final closed position of FIG. 15. From the intermediate position of FIG. 13, the handle portions 3" and 5" will be moved slightly apart under the force of the compressed spring 15. This will in turn lift the base portion 24 of the bail member 20 up from the lower corner 42 (FIGS. 13 and 16) of the C-shaped catch member 40 along the substantially straight wall 43 to the upper corner 44 (FIGS. 14 and 16). As the force of the compressed spring 15 further moves the handle portions 3" and 5" apart from FIG. 14 to FIG. 15, the base portion 24 of the bail member 20 will be moved along the curved inner surface 45 of the C-shaped catch member 40 (see FIG. 16) to the final, closed and locked position 46 of FIG. 15.

In this closed and locked position of FIG. 15, the cutting edge 11' of the knife blade 11 on the opposite end 5' of the elongated member 5 (see FIGS. 2 and 3) is safely received in the slot 13' of the anvil 13 essentially in the same position as shown in FIG. 3. Any efforts to open the jaws 3' and 5' from the closed and locked position will be prevented by the engaged base portion 24 (FIGS. 15 and 16) of the bail member 20 and the hook portion 48 of the C-shaped catch member 40. Any forces tending to move the handle portions 3" and 51" together from the closed and locked position of FIG. 15 will simply move the base portion 24 of the bail member 20 back to the lower corner 42 of FIGS. 13 and 16. Release of such forces will then result in the re-locking of the handle portions 3" and 5" in the biased closed position of FIG. 15.

In this manner, inadvertent release of the closed and locked handle portions 3" and 51" is virtually eliminated. Further and as described above, the engagement of the bail member 20 and catch member 40 is automatic making it self-locking. That is, all that needs to be done is to move the bail member 20 from its out-of-the-way or non-locking position of FIGS. 1-3 to its extended position of FIG. 9 and then squeeze the handle portions 30 and 511 together. The base portion 24 of the bail member 20 will then automatically abut and slide along the inner surface 5'" of the handle portion 5" to engage and lock with the C-shaped catch member 40 in the position of FIG. 15.

To release the handle portions 3" and 5" from the locked position of FIG. 15, the steps of FIGS. 12-15 are essentially reversed. In doing so, the handle portions 3" and 5" are squeezed closely together from the position of FIG. 15 to that of FIG. 13. The bail member 20 is then manually engaged and held down against the inner surface 5''' of the handle portion 5". Thereafter, the handle portions 3" and 5" are either manually or under the force of the compressed spring 15 separated with the base portion 24 of the bail member 20 riding up the handle surface 5''' away from the catch member 40.

Figure 9:
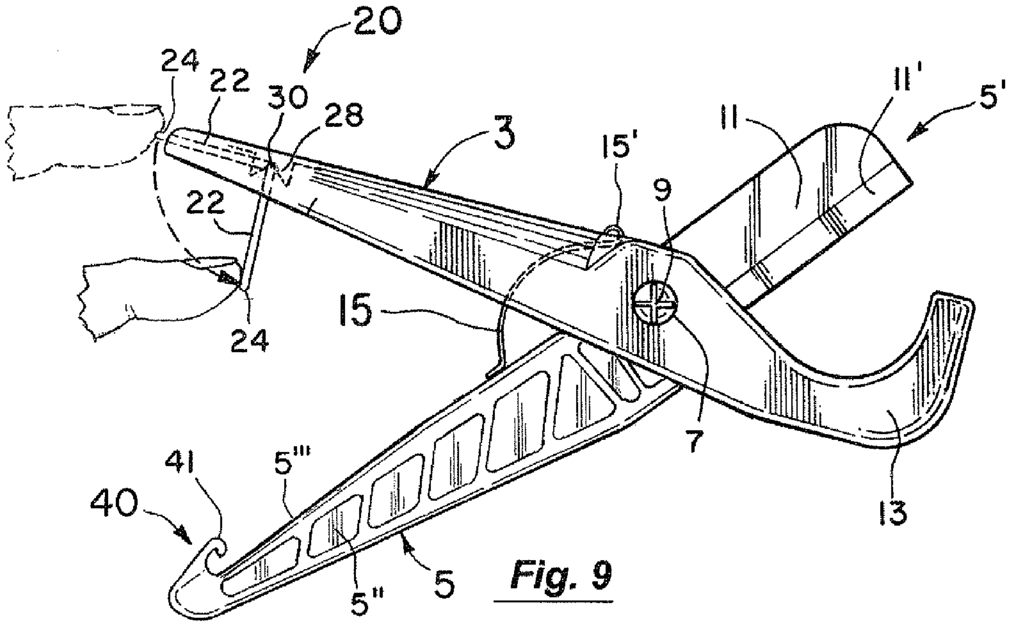
In FIG. 9, the bail member of the locking mechanism has been manually moved from the out-of-the way position of FIGS. 1-3 and 8 to an extended position so that as the handles are moved toward each other (FIG. 10), the bail member will abut the inner surface of the other handle (FIG. 11) and slide along it (FIGS. 12-13) into engagement (FIGS. 14-15) with the catch member on the other handle.
Figure 12:
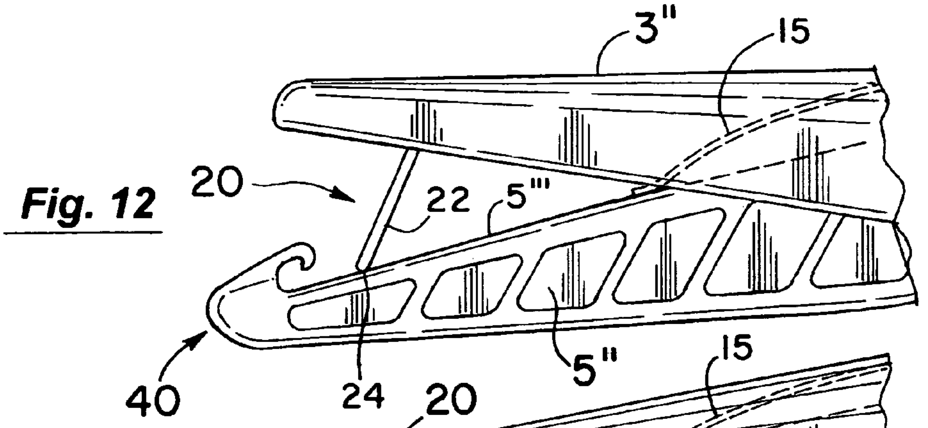

In the preferred embodiment, the catch member 40 is fixedly mounted (e.g., integrally molded) to the handle portion 5" at an end location. The end location as illustrated (e.g., FIGS. 9 and 11) is spaced farther from the main pivotal axis 9 of the tool 1 than the pivotal axis 30 of the bail member 20 is spaced from the main pivot 9. More specifically and as illustrated in FIGS. 9 and 11 the freestanding end portion 41 of the C-shaped catch member 40 is preferably spaced from the elongated member 5 with the freestanding end portion 41 (see FIG. 11) also spaced farther from the pivotal axis 9 of the cutting tool 1 than the pivotal axis 30 of the bail member 20 is spaced from the axis 9. Additionally, the legs 22 of the bail member 20 in the position of FIG. 11 preferably extend at an acute angle A to the inner surface 5''' of the handle portion 5" as the bail member 20 abuts it. In this manner, further squeezing of the handle portions 3" and 5" together (FIG. 12) will cause the abutting bail member 20 to slide along the surface 5''' away from the main pivotal axis 9 toward the catch member 40.

Figure 7:
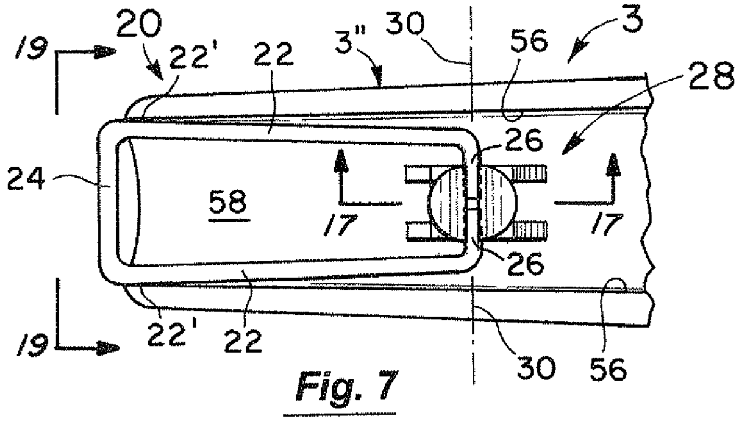
FIG. 7 is a view taken along line 7-7 of FIG. 2 illustrating the out-of-the way positioning of the bail member of the locking mechanism when the cutting tool is in use.
Figure 8:
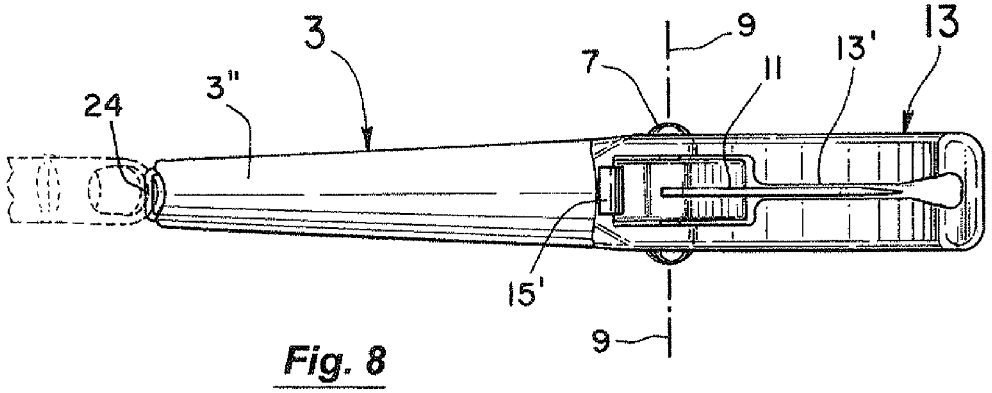
FIG. 8 is a top plan view taken along line 8-8 of FIG. 1 which together with FIGS. 9-15 sequentially show the self-locking operation of the bail member as the handles are squeezed together.

As shown in FIGS. 7 and 17, the bail member 20 is preferably mounted to the underside of the handle portion 3" by a compression or frictional fitting at 28. In this regard, the cylindrical pivot members 26 on the legs 22 of the bail member 20 in FIG. 7 preferably have an outer diameter at 52 (e.g., 0.060 inches in the exploded view of FIG. 18) greater than the spacing between the uprights 53 (e.g., 0.045 inches). The outer diameter 52 is also slightly greater than the relaxed diameter d (e.g., 0.057 inches) of the curved notch 54 in the fitting 28. The notch 54 as shown extends along the pivotal axis 30 and preferably extends more than 180 but less than 360 degrees about the pivotal axis 30. With these dimensions, the pivot members 26 will separate the flexible uprights 53 as they pass by and will be received or pinched in a slight compression fit in the notch 54 as the uprights 53 of the flexible mounting 28 rebound or snap back toward one another. In this manner, free movement of the bail member 20 about the axis 30 in the assembled position of FIG. 17 is resisted by the compression or frictional fit. The bail member 20 including its base portion 24 will then be biased to stay in any position (e.g., FIG. 9) the bail member 20 is manually pivoted about the axis 30. In particular, the bail member 20 will stay in the out-of-the-way or non-locking position of FIGS. 1-3 and 7 (when the tool 1 is making cuts). Additionally, the bail member 20 will stay in the extended position of FIG. 9 (in preparation for it abutting the handle surface 5''' as in FIG. 11 to begin the self-locking procedure).

Further assisting the holding of the bail member 20 in its non-locking position of FIGS. 1-3 and 7 when the tool 1 is cutting is the preferred geometry of the bail member 20. As best seen in FIG. 7, the legs 22 of the bail member 20 are preferably non-parallel and diverge or extend away from one another in a direction away from the pivotal axis 30 toward the base portion 24. Additionally, the cross section of the handle portion 311 (see FIG. 19 which is an end view taken along line 19-19 of FIG. 7) is preferably U-shaped with legs 56 and a base portion 58. The inner spacing 60 of the legs 56 of the U-shape (e.g., 0.500 inches) is then slightly less than the outer spacing 62 (e.g., 0.520 inches) of the outer portions 22' of the bail legs 22 adjacent the bail base portion 24 (see also FIG. 7).

Consequently, when the bail member 20 is pivotally moved toward the base portion 58 of the U-shaped cross section in FIG. 19 (i.e., from the position shown in dotted lines to the position shown in solid lines), the bail member 20 will then frictionally engage the legs 56 of the cross section. More specifically, the outer portions 22' of the legs 22 of the bail member 20 adjacent the base portion 24 (see again FIG. 7) will frictionally engage the legs 56 (see also FIG. 19) of the cross section of the handle portion 3". This frictional or interference fit enhances the frictional resistance of the bail member 20 away from its out-of-the-way or non-locking position of FIGS. 1-3. This resistance is in additional to the drag on the bail member 20 that is already provided by the compression or frictional fitting 28 of FIG. 17 on the bail member 20. It is also noted as to the U-shaped inner cross section of the handle portion 311 that at least a portion of the C-shaped catch member 40 will be received in the cross section (see FIGS. 3 and 13) as the handle portions 3", 5" are moved together. The C-shaped catch member in this regard and as shown (e.g., see FIG. 1) extends away from the handle surface 5''' toward the opposing handle portion 3".

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A cutting tool (1) primarily intended for cutting plastic pipe (2), said cutting tool including first and second elongated members (3,5) connected to each other for pivotal movement about a first pivotal axis (9) between the respective ends (3',3" and 5',5") of the first and second elongated members, said first elongated member (3) having a curved anvil (13) adjacent one end (3') thereof and a handle portion (3") adjacent the other end, said second elongated member (5) having a knife blade (11) adjacent one end (5') thereof and a handle portion (5") adjacent the other end, said knife blade (11) having a cutting edge (11') and said curved anvil (13) of said first elongated member (3) having a slot (13') therein for receiving the cutting edge (11') of said knife blade (11) when said elongated members (3,5) are moved to a closed position by squeezing said handle portions (3", 5") together, said cutting tool (1) further including a spring (15) to bias said handle portions (3", 5") of said elongated members (3,5) apart toward an open position to separate said knife blade (ll) and curved anvil (13) to receive the pipe (2) therebetween, and a locking mechanism to selectively lock said first and second elongated members (3,5) in said closed position, said locking mechanism including a substantially U-shaped bail member (20) and a substantially C-shaped catch member (40), said U-shaped bail member (20) having two legs (22) and a base portion (24) extending therebetween, said legs being pivotally mounted to the handle portion of one of the elongated members for movement relative thereto about a second pivotal axis (30) with the base portion (24) of the bail member (20) spaced from said second pivotal axis (30), said C-shaped catch member (40) being fixedly mounted to the handle portion of the other elongated member at a location therealong spaced farther from the first pivotal axis (9) of the cutting tool (1) than the spacing of said second pivotal axis (30) of the bail member (20) from said first pivotal axis (9), said handle portion of the other elongated member having a surface (5''') extending away from the first pivotal axis (9) of the cutting tool (1) toward the C-shaped catch member (40), said bail member (20) being manually positionable about the second pivotal axis (30) with the legs (22) thereof extending toward the handle portion of the other elongated member and with the base portion (24) of the bail member (20) positioned to abut the surface (5''') of the handle portion of the other elongated member at an acute angle (A) as the handle portions (3'', 5'') are moved together toward said closed position, said base portion (24) of the bail member abutting and sliding along said surface (5''') away from said first pivotal axis (9) as said handle portions (3'', 5'') are moved together to engage said bail member (20) and said C-shaped catch member (40) in a locking position to secure said elongated members (3,5) in said closed position wherein the legs (22) of the bail member have outer portions (22') adjacent the base portion (24) thereof spaced a first distance apart (62) and said handle portion of the one elongated member has a substantially U-shaped inner cross section with two legs (56) and a base portion (58) extending therebetween, the legs (56) of said inner cross section being spaced apart a second distance (60) less than said first distance (62), said bail member being manually positionable about said second pivotal axis (30) with the outer portions (22') of the legs of said bail member frictionally engaging the legs (56) of the inner cross section and holding the base portion (24) of the bail member in a position adjacent the base portion (58) of the inner cross section in a non-locking position with the C-shaped catch member when the elongated members are moved together toward said closed position.

2. The cutting tool of claim 1 wherein the base portion (24) of the bail member is positionable about said second pivotal axis (30) in a non-locking position extending outwardly beyond the handle portion of the one elongated member relative to the first pivotal axis (9).

3. The cutting tool of claim 1 wherein the legs (22) of the bail member in the non-locking position extend substantially perpendicular to the first pivotal axis (9) of the cutting tool (1)

4. The cutting tool of claim 1 wherein the legs (22) of the bail member extend away from one another in a direction from the second pivotal axis (30) toward the base portion (24) of the bail member.

5. The cutting tool of claim 1 wherein the base portion (24) of the bail member in said non-locking position extends outwardly beyond the handle portion of the one elongated member relative to the first pivotal axis (9).

6. The cutting tool of claim 1 wherein said bail member is pivotally mounted to the base portion (58) of the inner cross section of the handle portion of the one elongated member.

7. The cutting tool of claim 1 wherein said handle portion of the one elongated member has a substantially U-shaped inner cross section with two legs (56) and a base portion (58) extending therebetween, said bail member being pivotally mounted to the base portion (58) of the inner cross section.

8. The cutting tool of claim 7 wherein said bail member is pivotally mounted to said handle portion by a frictional fitting (28) wherein said bail member frictionally resists being moved about said second pivotal axis (30).

9. The cutting tool of claim 1 wherein said bail member is pivotally mounted to said handle portion by a frictional fitting (28) wherein said bail member frictionally resists being moved about said second pivotal axis (30).

10. The cutting tool of claim 1 wherein the legs (22) of the bail member extend away from one another in a direction from the second pivotal axis (30) toward the base portion (24) of the bail member.

11. The cutting tool of claim 1 further including pivot members (26) mounted on the legs (22) of the bail member to extend toward one another along the second pivotal axis (30)

12. The cutting tool of claim 11 wherein the pivot members (26) are mounted to the handle portion of the one elongated member by a frictional fitting (28) to resist movement of the bail member relative to the handle portion about the second pivotal axis (30)

13. The cutting tool of claim 1 wherein said C-shaped catch member (40) extends away from the surface (5''') of the handle portion of the one elongated member in a direction toward the handle portion of the other elongated member.

14. The cutting tool of claim 13 wherein the handle portion of the other elongated member has a substantially U-shaped inner cross section and at least a portion of the C- shaped catch member is received in said cross section when the elongated members are moved together.

15. The cutting tool of claim 1 wherein the handle portion of the other elongated member has a substantially U-shaped inner cross section and at least a portion of the C-shaped catch member is received in said cross section when the elongated members currently amended are moved together.

16. The cutting tool of claim 1 wherein said spring with said bail member and C-shaped catch member engaged biases said bail member and C-shaped catch member in said locking position.

17. The cutting tool of claim 16 wherein said spring is a leaf spring.

18. The cutting tool of claim 1 wherein said second elongated member (5) is received in a central aperture (21) through said first elongated member (3).

19. A cutting tool (1) primarily intended for cutting plastic pipe (2), said cutting tool including first and second elongated members (3,5) connected to each other for pivotal movement about a first pivotal axis (9) between the respective ends (3',3'' and 5',5'') of the first and second elongated members, said first elongated member (3) having a curved anvil (13) adjacent one end (3') thereof and a handle portion (3'') adjacent the other end, said second elongated member (5) having a knife blade (11) adjacent one end (5') thereof and a handle portion (5n) adjacent the other end, said knife blade (11) having a cutting edge (11') and said curved anvil (13) of said first elongated member (3) having a slot (13') therein for receiving the cutting edge (11') of said knife blade (11) when said elongated members (3,5) are moved to a closed position by squeezing said handle portions (3'',5'') together, said cutting tool (1) further including a spring (15) to bias said handle portions (3'',5'') of said elongated members (3,5) apart toward an open position to separate said knife blade (11) and curved anvil (13) to receive the pipe (2) therebetween, and a locking mechanism to selectively lock said first and second elongated members (3,5) in said closed position, said locking mechanism including a substantially U-shaped bail member (20) and a substantially C-shaped catch member (40), said U-shaped bail member (20) having two legs (22) and a base portion (24) extending therebetween, said legs being pivotally mounted to the handle portion of one of the elongated members for movement relative thereto about a second pivotal axis (30) with the base portion (24) of the bail member (20) spaced from said second pivotal axis (30), said C-shaped catch member (40) being fixedly mounted to the handle portion of the other elongated member at a location therealong spaced farther from the first pivotal axis (9) of the cutting tool (1) than the spacing of said second pivotal axis (30) of the bail member (20) from said first pivotal axis (9), said handle portion of the other elongated member having a surface (5''') extending away from the first pivotal axis (9) of the cutting tool (1) toward the C-shaped catch member (40), said bail member (20) being manually positionable about the second pivotal axis (30) with the legs (22) thereof extending toward the handle portion of the other elongated member and with the base portion (24) of the bail member (20) positioned to abut the surface (5''') of the handle portion of the other elongated member at an acute angle (A) as the handle portions (3'',5Δ) are moved together toward said closed position, said base portion (24) of the bail member abutting and sliding along said surface (5'') away from said first pivotal axis (9) as said handle portions (3'',5'') are moved together to engage said bail member (20) and said C-shaped catch member (40) in a locking position to secure said elongated members (3,5) in said closed position wherein said bail member is pivotally mounted to said handle portion by a frictional fitting (28) wherein said bail member frictionally resists being moved about said second pivotal axis (30) and wherein said frictional fitting includes a flexible mounting (28) on said handle portion with a curved notch (54) extending along the second pivotal axis (30) and thereabout more than 180 degrees and less than 360 degrees, at least one of the pivot members (26) on said bail member being substantially cylindrical with an outer diameter (52) greater than the inner diameter (d) of the curved notch (54) wherein said cylindrical pivot member (26) is pinched in said curved notch (54) in a compression fit to resist being moved about said second pivotal axis (30).

* * * * *